United States Patent [19] [11] 4,081,304

Bruseschi [45] Mar. 28, 1978

[54] METALLIZING PROCESS AND APPARATUS FOR APPLYING METAL SHEET ONTO VARIOUSLY SHAPED LEDGES OR FRAMES

[76] Inventor: Duilio Bruseschi, Via C. Percoto, 19, Udine, Italy, 33100

[21] Appl. No.: 678,920

[22] Filed: Apr. 21, 1976

[30] Foreign Application Priority Data

Apr. 21, 1975 Italy ............................... 83357 A/75
Jan. 12, 1976 Italy ............................... 83306 A/76

[51] Int. Cl.[2] ........................ B32B 31/20; B32B 1/10; B32B 13/10

[52] U.S. Cl. .................................... 156/212; 29/469.5; 156/249; 156/297; 156/477 R; 428/164

[58] Field of Search ............... 156/201, 212, 213, 249, 156/475, 477 R, 481, 482, 488, 493, 540, 555, 580, 297, 468, 486; 29/469.5; 428/164; 144/309 Q, 309 W, 315 A

[56] References Cited

U.S. PATENT DOCUMENTS

| | | | |
|---|---|---|---|
| 1,809,875 | 6/1931 | Swallow | 156/540 |
| 2,044,356 | 6/1936 | Keeran | 156/297 |
| 2,412,693 | 12/1946 | Pierson | 156/304 |
| 3,047,934 | 8/1962 | Magner, Jr. | 264/345 |
| 3,296,056 | 1/1967 | Bechtold | 156/212 |
| 3,433,698 | 3/1969 | Billings | 156/540 |
| 3,509,000 | 4/1970 | Brown | 156/540 UX |
| 3,575,772 | 4/1971 | Billings | 156/540 |
| 3,607,533 | 9/1971 | Moore | 156/555 |
| 3,649,425 | 3/1972 | Alexander | 156/213 |
| 3,698,989 | 10/1972 | Voorhees | 156/477 |
| 3,837,952 | 9/1974 | Mogford | 156/540 |
| 3,900,362 | 8/1975 | Schaffer | 156/493 |

*Primary Examiner*—William A. Powell
*Assistant Examiner*—Thomas Bokan
*Attorney, Agent, or Firm*—Browdy and Neimark

[57] ABSTRACT

A process and an apparatus for metallizing wooden ledges, such as frames, with a curved cross section. The cross-section is first subdivided into a plurality of tracts each encompassing a straight or only slightly curved portion of the periphery. The tracts should intersect at least at the center of the more curved areas such as those having acute angled portions or concavities. A number of metallized tapes equal to the number of such tracts are then applied longitudinally with a slight overlap between adjacent strips.

21 Claims, 13 Drawing Figures

METALLIZING PROCESS AND APPARATUS FOR APPLYING METAL SHEET ONTO VARIOUSLY SHAPED LEDGES OR FRAMES

FIELD OF THE INVENTION

The present disclosure concerns a process for mechanical metallizing (such as gilding, silver plating, bronzing, coppering etc.) carried out using thin metal sheets to cover ledges and the like, such as frames, etc., whose section has an extended and substantially constant shape, made of wood and similar materials.

BACKGROUND OF THE INVENTION

There is already well-known a process of metallizing employing thin metal sheets and especially applied to variously sectioned ledges to obtain gilded frames and the like.

With special reference to the constant-sectioned wooden ledges, which are those mostly produced, the known process of metallizing (as for instance the gilding or silver plating with thin metal sheets) comprises the following steps, which are performed after the ledge of an adequate shape has been obtained in a conventional way by means of traditional machinery;

1 — the surface to be treated is covered with special products, such as chalk and other more refined products, to obtain a smooth and stabilized surface in an economical and rapid manner 2 — the semi-finished products so obtained are covered with a further surface covering acting as an adhesive fit for receiving the thin metal sheets;

3 — the ledge surface to be treated is manually covered with thin metal sheets made of gold, pinchbeck, silver or the like, bronze or the like, copper or the like, etc., in order to obtain the desired metallic appearance;

4 — the fixing operation of the applied thin metal sheets is then manually performed.

With special reference to the operations mentioned in (3) and (4), it is well-known that the ledge surface covering is carried out using small metal sheets whose dimensions do not exceed the 20 × 20 cm. size and their thickness is extremely reduced. They are manually made to adhere to the surface to be covered and they are laid one after the other, slightly overlapping. When such an operation is over, a piece of cotton-wool is then manually passed on the covered surface to make these sheets adhere thoroughly on the surface of the ledge and/or the structural shape. The operation will be effected paying attention to pass on the surface and to "smooth" it always following the only direction made possible by the scale overlapping in order to avoid the lifting up and breaking of the sheet edges before they adhere thoroughly to the surface.

As is easily understood, such a procedure implies not only a long and burdensome work, but also a remarkable quantity of labor. What is more, the percentage of wasted metal sheet material is high due to the fact that the sheet metal supplied has standard dimensions and so a good deal of this expensive material (30 to 50 percent) is to be cut off especially from the transversely exceeding sides of the small sheets. Such a waste becomes more and more noticeable when structural shapes having a small transverse development have to be covered. Besides, a supplying of metal sheets having a reduced breadth would not solve the problem because it would not be suitable to all the possible different developments of the metal sheets and it would not be handy. Even if such a drawback could be avoided, the remarkable quantity of labor required would still weigh heavily on the effectiveness of this process.

Therefore, when treating flat surfaces, such metal sheets have been replaced by metal sheet tapes supported by a pull-resistant tape. Such tapes are lengthwise and not transversely applied to the surface.

The use of the tape is remarkably advantageous because it allows diminishing the quantity of labor. But up to today it is still used only for flat surfaces because the problem of covering complex structural shapes - particularly those having concave parts - has not been solved yet.

As a matter of fact, the tape would not fit well on such structural shapes, especially on the concave parts, because the metal sheet rolled on a tape adheres immediately on the surface to be covered as soon as it is laid on the surface and in this way the metal sheet cannot conform adequately to the curvings of the structural shape. In fact, when considering the convex curvings, such a drawback is avoided making the tape, which is forced to adhere along one only longitudinal line, adhere progressively on one side and on the other of such longitudinal line. But acting in this way is not possible when the curvings of the surface to be treated are concave because the tape would adhere on two longitudinal lines on one side and on the other of the concave part, so that, when pressing the tape against the surface, a central longitudinal crack spreading all around would occur and the metallizing itself would be ruined.

SUMMARY OF THE INVENTION

The present disclosure is based on the conception that however variously curved, concave or convex, provided with positive and negative edges which are more or less sharp, a structural shape may be, it is always possible to decompose it into shorter straight pieces. So, when a metallizing tape of a most suitable width is applied to these structural shapes, any of them can be covered even if they are provided with acute-angled parts.

The width of the tape is therefore chosen in relation with the general conformation of the structural shapes to be covered and several experiments have proved that the average 1 cm. broad tape seems to be suitable for the most varied coverings. The use of tapes having a width varying in accordance with any specific requirement and in accordance with the conceptual grounds of the present disclosure is not however excluded.

The first step of the process to be carried out consists in the subdivision of the structural shapes to be covered into many parts, each of them having a rectilinear development inferior to the width of the tape chosen for the covering. Attention will be paid so that each stripe determined by the width of these parts or tracts composing the structural shape will not exceed, or at the most slightly exceed, the structural development of a flat or convex part comprised between two concave parts or acute-angled grooves.

In this way an indefinite number of stripes with a preferably equal length surface will be obtained. Then, such stripes will be successively and progressively covered with the tape, one after the other, so getting not only the longitudinal (and not transversal) overlap of the metal sheets, but also a mechanized fixing and/or smoothing of them on the surface. In fact, the tape applying turns out to be much easier and feasible if the process is carried out by a machine which is equipped with one or more tape distributors and with means necessary to move forward the structural shape. When such distributors distribute the metal sheet tape, suitable pressing rollers assure a thorough adherence of the metal sheet to the treated surface.

In an improved application of the process, the distribution sets of the machine (or machines) are provided with rollers automatically winding the metal sheet support tape once the metal sheet tape is made to adhere to the structural shape.

In a further improved application, some fixed cotton rollers can be mounted at the end of the distributors so that when the already covered structural shape passes between them the covered surfaces get compactly smooth.

A further improvement aims to avoid the remarkable complexity which is usually met when using a roller to wind the tape, considering that the tape must travel at a variable speed which is progressively decreasing. In fact, to obtain such a device, the manufacturing costs were too high, the tape traction was not always constant, and the paper tape was easily broken. In the improvement, the roller has been replaced with an intake flexible pipe which sucks in the paper tape.

A further improvement then provides two pressing rollers to get a more effectively adherent spreading of the metal sheet tape.

A further improvement consists in the fact that the tape is kept constantly braked, combining two different friction movements: the rolling friction progressively increasing while diminishing the tape diameter and the unwinding friction, due to the axial grip, which progressively diminishes as the roll diameter decreases. A constant braking of the unwinding tape is so obtained.

A further improvement consists in the fact that the support is a paper tape. A further improvement consists in providing a belt conveyor under the ledge to be metallized which runs below the operating set so that it can operate in all directions around the structural shape. A further improvement consists in adopting an elastic sponge gum material for the pressing roller whose exterior surface is compact and smooth.

BRIEF DESCRIPTION OF THE DRAWINGS

A better understanding of the disclosure will be obtained from the accompanying drawings of some merely illustrative applications of the invention. In the drawings.

DETAILED DESCRIPTION OF PREFERRED EMBODIMENTS

Figure 1:
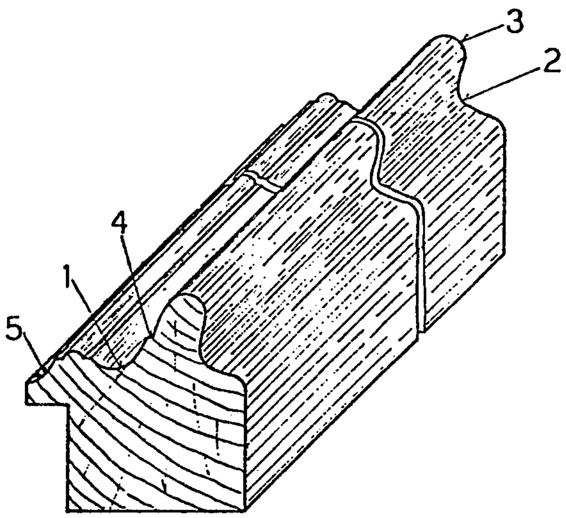
FIG. 1 is an elementary perspective view of a portion of structural-shaped ledge or frame.

Referring now to the mentioned figures, and taking in consideration the surface, in FIG. 1, which has to be gilded, the covering will be obtained according to the following steps:

The structural shape is divided into tracts which do not have too much curve and have approximately the same length, or in any case shorter than the width of the available tapes. The subdivision is preferably effected in straight tracts or substantially little curving in a manner that they finish or begin with grooves, or notches, or acute-angled parts. Thus, the structure being considered could be divided into the tracts *a,b,c,d;* but if the resulting covering isn't successful, these tracts can be further divided into a higher number of pieces. The subdivision represented in FIG. 2 substantially considers the large concavities 1, 2 and the accentuated convexity 3 and along them the overlapping lines of the tapes. The small toothings, as indicated in 4 and the non-deep grooves as in 5 might be disregarded when applying the metallizing since the eventual crackings of the metal sheet tape can there be easily concealed; but if perfect results are desired, also these parts should be taken into consideration. Moreover, it can be noticed that in the subdivision represented in FIG. 2 while the tracts *b, c, d* look quite the same when developed, the tract *a* is longer and so either a larger tape or an additional tape is required, and, consequently, another new appliance point.

Figure 2:
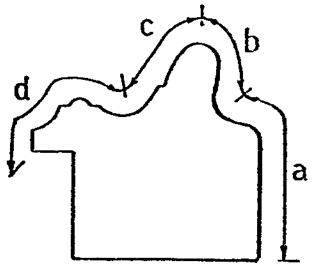
FIG. 2 is a sectional view similar to FIG. 1 and illustrating how the structural shape must be subdivided.
Figure 3:
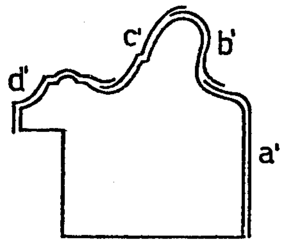
FIG. 3 represents the same structural shape and the way to cover it.

Referring again to the subdivision of FIG. 2, the tapes applied will be partially overlapping, as shown in the representation of FIG. 3 which is a detached and enlarged drawing in order to make the details clearer.

The tapes are in fact applied according to the following order: the tape (*a'*) is first laid; then the tape (*b'*) which slightly overlaps the (*a'*); then the tape (*c'*) which slightly overlaps the (*b'*); then the tape (*d'*) which overlaps the (*c'*), so determining the total metallizing of the surface. The applying process can be, of course, carried out also in the contrary direction.

Figure 4:
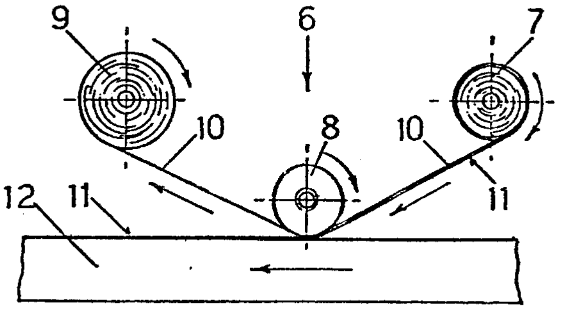
FIG. 4 is a schematic side view of one of the operating sets of the machine.

A first applying process of each metal sheet tape is clearly shown in FIG. 4, where the distribution set is indicated in 6.

This set is constituted by 3 elements, that is: the tape roll 7, the pressing roller 8 and the winder 9. The tape is made of two parts: the paper support 10 and the underlying metal sheet 11.

When the tape is being unwound from the roll 7 it passes between the roller 8 and the ledge to be metallized 12. The pressure of the roll 8 is such that the metal sheet 11 is forced to adhere to the ledge or frame below 12, which is proceeding at the same speed of the pressing roller 8, so to enable the winder 9 to rewind at once the paper support 9. In this way the ledge 12 will be already covered when it arrives downstream of the pressing roller 8.

Figure 5:
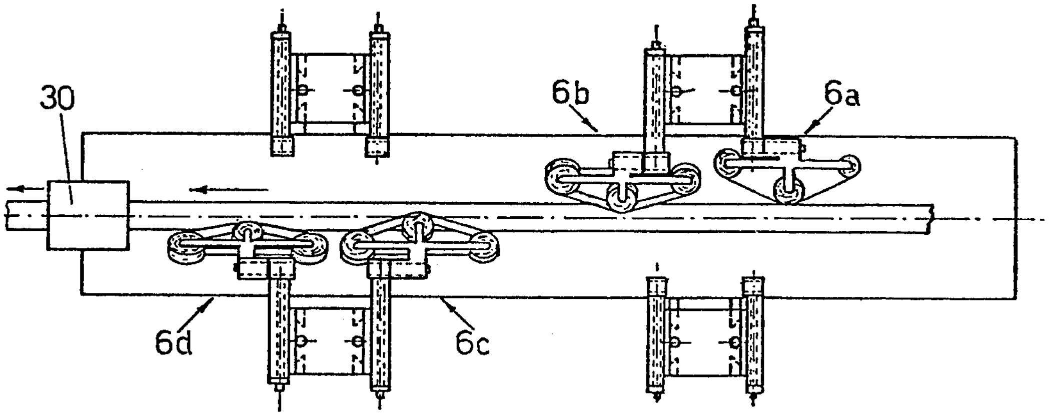
FIG. 5 is a schematic top view of an operating line for the ledge exterior covering illustrated in FIG. 3 with 4 operating sets as shown in FIG. 4.
Figure 6:
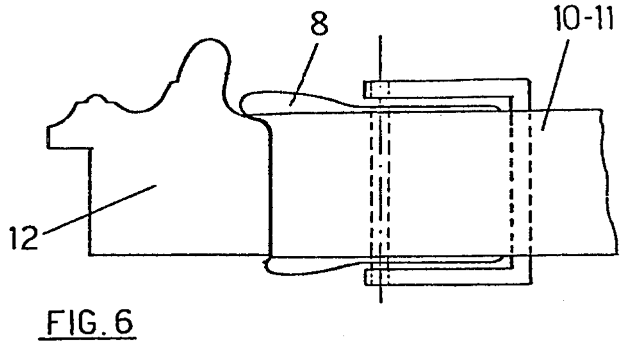
FIGS. 6, 7, 8, 9 are a schematic shaped ledge sectional view of the several tapes and of their relative distribution sets in a logical succession, one after the other, as shown in FIG. 5.
Figure 7:
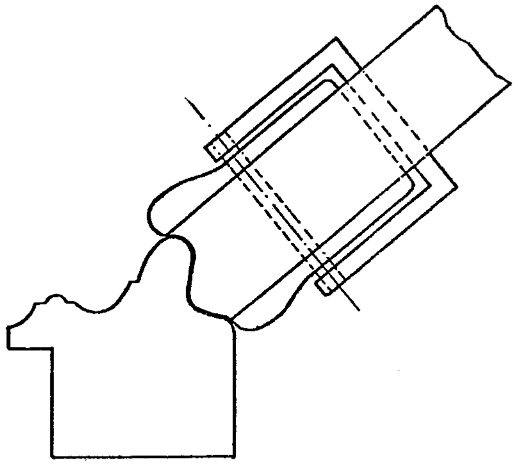
Figure 8:
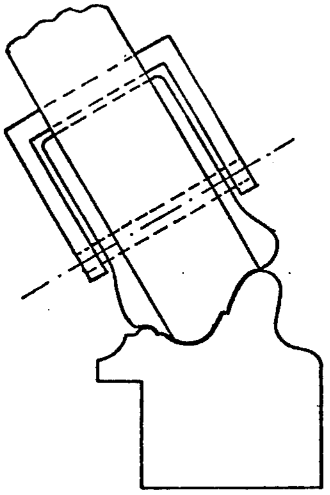
Figure 9:
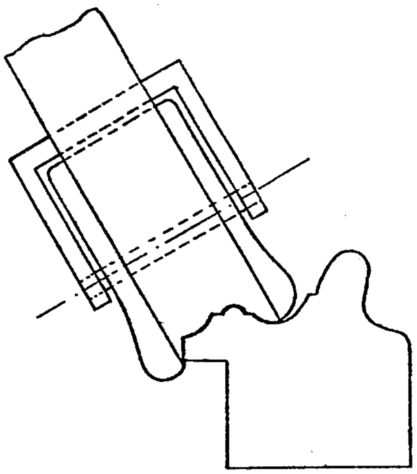

It goes without saying that there will be as many distribution sets as the covering tapes to be applied according to a logical sequence. Therefore, referring specifically to FIG. 3, there will be 4 sets (*6a, 6b, 6c, 6d*) as shown in the schematic representation of FIG. 5. Each set will act respectively on the tracts (*a,b,c,d*) as indicated in the FIGS. 6,7,8,9. The pressing The pressing roller 8 is made of a supple material, like rubber, so to be fit to take the shape of the structural shape piece itself and accordingly comform the shape of the covering tape (see FIGS. 6,7,8,9 abovementioned).

At the end of these appliance sets one or more tampons 30 made of cotton or other similar suitable materials can be provided to smooth the surface of the covered frame.

The proceeding metallized structural shape or frame will shuffle on said tampons 30 in order to obtain an automatic mechanical fixing of the metal covering itself.

Referring to other preferred embodiments with two pressing rolls, the roll 7 is placed substantially high up behind the first pressing roll 8 and its unwinding is carried out so that the roll rotates in a direction which is opposite to that of the pressing rollers 8-8'; in this way, the obtained winding arc of the tape 10+11 in the first pressing roll 8 is notable. Downstream of the roller 8' the intake opening 9 is placed so to suck the paper support tape 10 after that the metal sheet tape 11 is made to adhere on the proceeding ledge 12. The roll 7 of the tape 10+11 is mounted on a supporting cardboard ring 13 which is loosely inserted on the fixed axis 14. The axis 14 supports a fixedly connected shoulder disc 15 against which the roll 7 is made to adhere by means of a clasping flange 16 mounted on a bearing support 17 and it is screwed to the ring 18 by a screw 19. It will be so obtained that the tape 10+11 of the roll 7, while unwinding, will be substantially braked by the shoulder disc 15 notwithstanding the diameter decrease because during such an operation also the friction between the ring 13 and the axis 14 increases, so making up for the progressive friction decrease in the shoulder disc 15.

Figure 11:
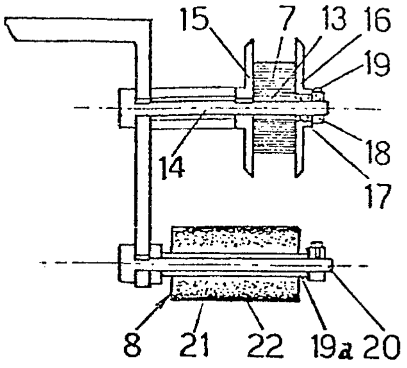
FIG. 11 is a sectional view along the line X—X passing through the roll and one of the two pressing rollers.

The roll 8 is the same as the roll 8' and it is supported by a plastic collet 19*a* and it is mounted on the axis 20. The rollers are constituted by a very elastic expanded rubber material having a sponge core 21 and a smooth, compact exterior surface 22 (FIG. 11). The tape 10 is sucked by an intake pipe 9' in each set so avoiding any disadvantage caused by speed variations.

Both the rollers 8, 8' and the roll 7 run in neutral and they are sent forward by the friction of the proceeding ledge 12.

Figure 10:
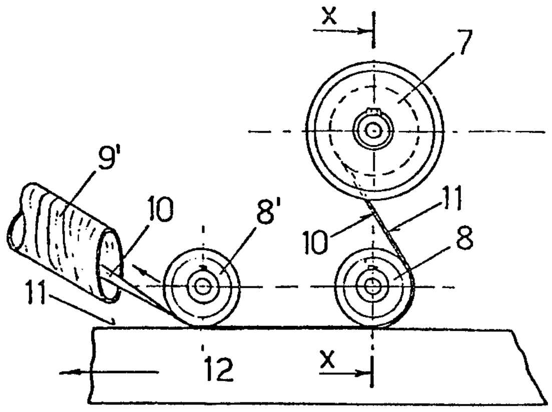
FIG. 10 is a schematic representation of an operating set provided with two pressing rollers and with an intake pipe for the support tape which detaches from the metal sheet tape after the latter is laid on the below-proceeding ledge.
Figure 12:
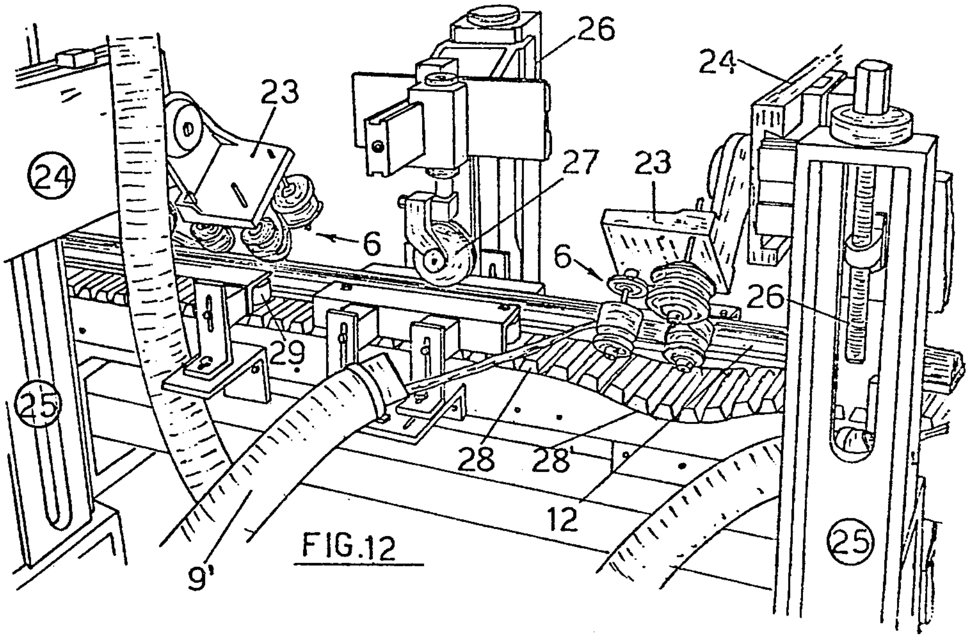
FIG. 12 is a perspective view of a part of the machine for the metallizing process in which the operating sets are represented.
Figure 13:
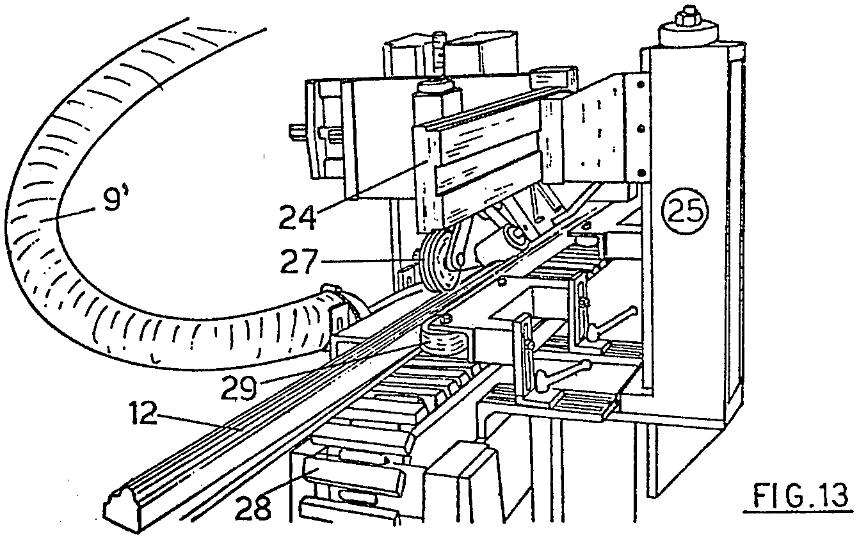
FIG. 13 is a perspective view of a partial representation of the outlet of the machine when the ledge is thoroughly metallized.

In FIGS. 12, 13, the operating groups of FIG. 10 and FIG. 11 are indicated in 6 and they are mounted on rotary stirrups 23 in the position on the transversal plane. The stirrups 23 are then mounted on the horizontal slide 24 and said horizontal slide slides on a vertical slide along the side columns 25 by well-known screw means. Between the operating sets 6 some columns alternatively support rollers 27 whose function is to keep the proceeding ledges 12 positioned on the longitudinal central bench.

Said feeding system is constituted by a belt conveyor 28 having a depression 28' at the level of the operating sets 6 so that they can operate also laterally on the proceeding ledge 12. Alternately, lateral counter-rollers are mounted in the position indicated in 29 to guide the ledge 12.

This has to be considered a merely illustrative application of the disclosure since the details of execution can vary without departing from the substance of the invention itself as it is described and hereinafter claimed.

I claim:

1. A metallizing process for covering ledges having a transverse cross-section including areas of substantial curvature, and more particularly including at least one concavity of substantial curvature, and a substantially constant shape in the longitudinal direction, comprising:

preparing for metallization the surface to be metallized, said surface being the surface of a ledge having a transverse cross-section including areas of substantial curvature, and more particularly including at least one concavity of substantial curvature, and a substantially constant shape in the longitudinal direction;

determining the locations of a plurality of longitudinally extending subdivisions of the surface of a transverse cross-section of the ledge, wherein each of said subdivisions encompasses a straight or slightly curved tract of the surface of the transverse cross-section of the ledge, and the lines of longitudinal intersection of adjacent subdivisions are disposed at least at the center of each area of substantial curvature of the surface of the transverse cross-section of the ledge including the center of each said concavity of substantial curvature; and applying a plurality of metallizing tapes in the longitudinal direction of the ledge, the number of said tapes being equal to the number of subdivisions, the point of application of each of said tapes being juxtaposed longitudinally along the ledge, wherein each pair of adjacent tapes are slightly overlapping.

2. A process in accordance with claim 1, wherein said tapes are applied in progression from one side of the ledge, viewed in cross-section.

3. A process in accordance with claim 1, wherein said applying step comprises pressing each tape against the surface to be covered with a pressing roller having a width at least equal to that of the tape, whereby the tape is forced to pass between the pressing roller and the ledge so that the metal tape sticks to the surface to be metallized by adherence.

4. A process in accordance with claim 3, wherein during said pressing step the tape is made to conform to the shape of the subdivision of the ledge being metallized by means of pressing roller having a surface which is elastically deformable to assume the shape of the surface against which it is pressed.

5. A process in accordance with claim 1, wherein the metallizing tapes each include a layer of support material which must be removed after application, further including braking the feed of said tape to control the tension therealong and winding the support material around a roller after the metallized tape has been applied to the ledge.

6. A process in accordance with claim 1, wherein the metallizing tapes each include a layer of metallic material and a layer of support material which must be removed after application of the metallic material to the ledge, further including aspirating the support material into an intake opening of a flexible suction pipe after the metallic material has been applied to the ledge.

7. A process in accordance with claim 1, further including conveying the ledge longitudinally past each of the application points, which application points are stationary.

8. A process in accordance with claim 1, further including smoothing the surfaces covered with metal, after said applying steps, with rollers of cotton or similar deformable material.

9. An apparatus for metallizing ledges having a transverse cross-section including areas of substantial curvature, and more particularly including at least one concavity of substantial curvature, and a substantially constant shape in the longitudinal direction, comprising:

a plurality of application means, each for applying a metallizing tape in the longitudinal direction of a ledge having a transverse cross-section including areas of substantial curvature, and more particularly including at least one concavity of substantial curvature, and a substantially constant shape in the longitudinal direction, said application means being disposed about the periphery of the ledge, longitudinally offset from one another, such that the strip of tape applied by each, when viewed along the surface of a transverse cross-section of the ledge, encompasses a straight or slightly curved tract of the surface of the transverse cross-section of the ledge, and the longitudinal intersection of adjacent strips of tape are slightly overlapping and disposed at least at the center of each area of substantial curvature on the surface of the transverse cross-section of the ledge including the center of each said concavity of substantial curvature.

10. An apparatus in accordance with claim 9, wherein each of said application means includes a pressing roller, having a width at least equal to that of the tape, for pressing the tape onto the subdivision of the surface to be metallized by that application means.

11. An apparatus in accordance with claim 10, wherein said pressing rollers are elastically deformable to assume the shape of the surface against which it is pressed, so conforming also the metallizing tape which is made to adhere to the surface.

12. An apparatus in accordance with claim 10, wherein said pressing rollers comprise sponge gum whose central core is expanded while the annular outer surface is smooth and compact although elastic.

13. An apparatus in accordance with claim 9, wherein the metallizing tape includes a layer of metal and a layer of support material and wherein each of said application means comprises:

a tape roll holder;

braking means for adjustably braking said tape roll holder;

at least one deformable pressing roller; and take-up means for taking up the support material after said pressing roller has caused the metal layer to adhere to the respective portion of the ledge, said take-up means comprising a flexible aspirator pipe for sucking the support material into an intake opening at the extremity of said pipe.

14. An apparatus in accordance with claim 13, wherein said tape roll holder is mounted behind said pressing roller to increase the contact surface of the tape on said pressing roller.

15. An apparatus in accordance with claim 13, further including means for conveying the ledge past said application means and wherein said tape roll holder and said pressing roller rotate idly, the tape being advanced by the proceeding ledge.

16. An apparatus in accordance with claim 13, wherein said braking means comprises a pair of flanges on said tape roll holder on opposite sides of the tape roll, one of said flanges being stationary and the other of said flanges rotating with the tape roll.

17. An apparatus in accordance with claim 9, wherein each of said application means are mounted on a rotatable holding means which in turn is mounted on a means for shifting said holding means in the horizontal and vertical directions within the vertical plane perpendicular to the longitudinal axis of the ledge.

18. An apparatus in accordance with claim 9, further including a conveyor belt for conveying the ledge longitudinally past said application means, said belt having depressions at the position of each of said application means.

19. An apparatus in accordance with claim 9, further including a smoothing means positioned downstream of each of said application means for smoothing the surface covered with metallizing tape, said smoothing means comprising rollers of cotton or other similar deformable material.

20. An apparatus in accordance with claim 13, wherein the support material is paper.

21. An apparatus in accordance with claim 13, including two of said pressure rollers.

* * * * *